March 4, 1969    R. S. BRIMHALL    3,430,653
HYDRAULIC VALVE AND SYSTEM

Filed Dec. 2, 1965

INVENTOR
RAY S. BRIMHALL
BY *M. Ralph Shaffer*
HIS ATTORNEY

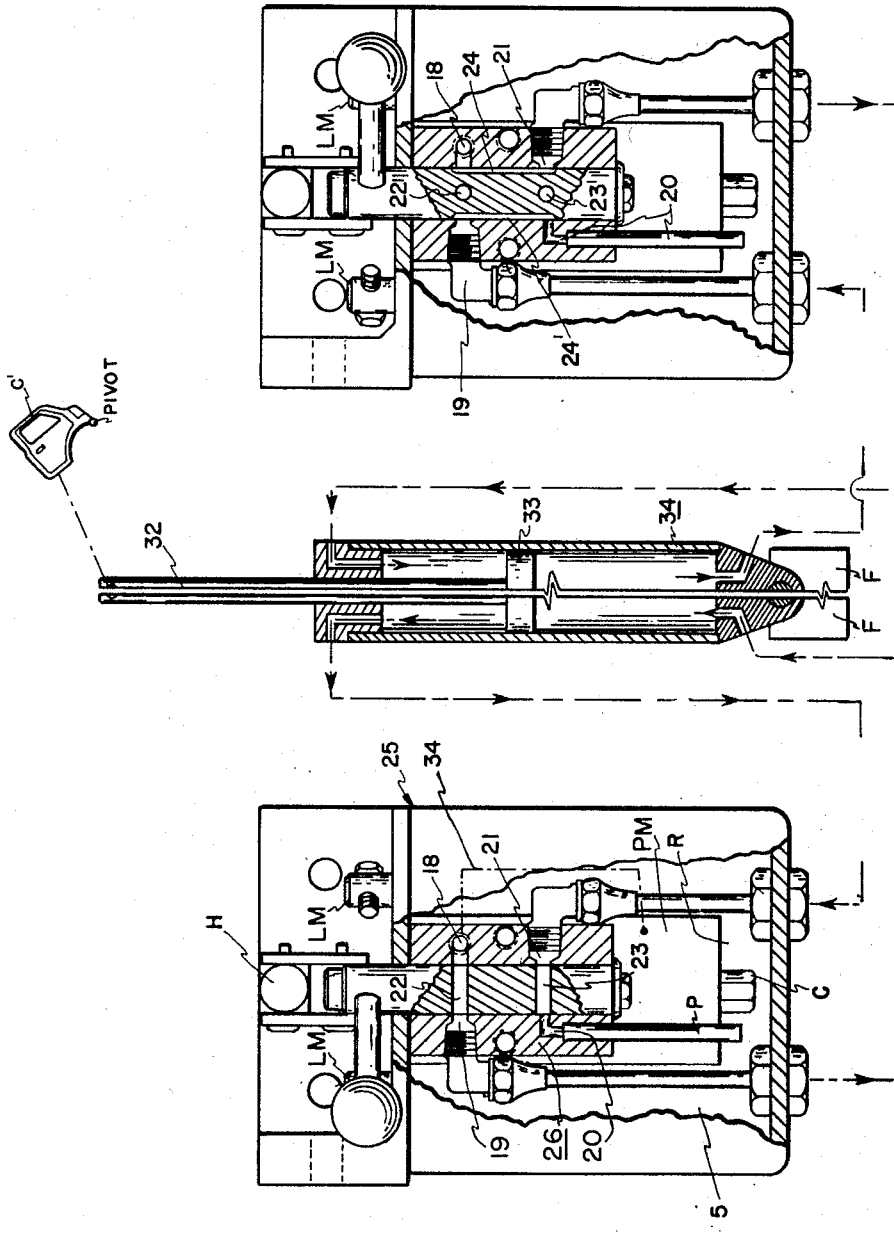

United States Patent Office 3,430,653
Patented Mar. 4, 1969

3,430,653
HYDRAULIC VALVE AND SYSTEM
Ray S. Brimhall, 4604 Idlewild,
Salt Lake City, Utah 84117
Filed Dec. 2, 1965, Ser. No. 530,242
U.S. Cl. 137—625.23         11 Claims
Int. Cl. F16k 11/07, 47/04

ABSTRACT OF THE DISCLOSURE

The present invention presents a new and improved four-way valve and system therefor wherein bi-directional flow through a work circuit is accomplished in cooperation with controlled and selective metering at the exhaust point of the valve, at which point unidirectional flow of fluid feeds back to the reservoir of the system containing the valve. Advantageous use is made of through-apertures through the valve spool provided in the valve as well as a pair of mutually spaced surface openings for providing shunting of hydraulic fluid across the spool and into a reverse circuit flow condition. It is to be noted that variable and selective metering is possible at the exhaust point of the valve, and this regardless of direction of flow of the work circuit associated with the valve. The invention also includes the concept of providing corresponding valve means in combination with a pivotable tractor cab, this to provide free-fall braked descent on both sides of the cab's pivot axis.

---

The present invention relates to hydraulic systems in general and hydraulic valves thereof, in particular and, more particularly, to a new and improved four-way valve and hydraulic system incorporating the same whereby there may be provided on the exhaust side of the valve, in the system, a metering effect, of preferably selectable and variable character, so that the force of gravity, for example, may be used in gradually returning or otherwise lowering a structure to a desired position.

In the past many types of four-way valves and valving systems have been provided to accomplish a number of purposes. A basic, four-way valve circuit includes a four-way valve having a pressure inlet port, an exhaust port, and a pair of inlet-outlet fluid ports, which are utilized to drive some object such as the piston within a double-acting, actuating cylinder. The external circuit will, of course, include the conventional reservoir and pump. Thus, when the valve is in neutral position there will be no fluid flow and hence no actuation of the cylinder used. When the valve is changed to one operating position, fluid enters the presure port and traverses through the valve so as to move the piston within the actuating cylinder in one direction. The pump will be continuously running mechanically, or hand pumped, until the entire extremity of travel is achieved. To accomplish the return stroke of the piston the valve will be placed in a second operating condition wherein circuit flow is reversed through the valve. Again, the pump conventionally is continuously operating until the return of the piston stroke has been completed.

Many types of structures such as cabs on trucks, for example, are pivoted to a frame or other support, and an actuating cylinder is used to raise the cab, for example, above the frame up to and past the center of gravity position. Such is conventionally provided for traction vehicles in order to perform certain maintenance functions either with respect to the frame structure or on the underneath side of the cab. Oftentimes, for sake of cost reduction, hand-operated pumps are used to drive the cab upwardly to its 90° position and past the center of gravity point downwardly as necessary. This operation is very time-consuming. Furthermore, the operator has to reverse the direction of travel of the cab and hence will be obliged to operate the pump, generally manually, from the present position back over the center of gravity point to the normal return position with respect to the frame.

It would, of course, be highly desirable to provide a gravity-fall type of system wherein the force of gravity itself may be used, in connection with metering offered in the present invention, to allow the cab to descend gradually to a desired position and, after the cab is returned past the center of gravity point, to permit the cab to return gradually to its horizontal position on the frame.

Accordingly, a principal object of the present invention is to provide a new and improved hydraulic valve.

A further object is to provide a new and improved four-way hydraulic valve having a metered fluid exhaust.

An additional object is to provide a four-way hydraulic valve and, in combination therewith, provision for a selective, metered exhaust.

An additional object is to provide a hydraulic valve having a self-contained, selective, metered exhaust feature wherein the exhaust or flow can be immediately changed from a generally open condition to a small or metered condition.

A further object is to provide in a four-way valve certain self-contained metering structure including partially-registered ports and passageways, this so that very fine adjustments in metering can be effected through rather large rotational displacements of the valve spool.

A further object is to provide a hydraulic system having an actuating cylinder and useful valving means such that portions of the cylinder stroke may be accomplished through gravity and a metered return of hydraulic fluid through the valve.

An additional object is to provide, for pivotal structures having movements over their center of gravity points, a hydraulic system and valve which will permit gradual metered descent of the structure on both sides of the structure's center of gravity.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURES 5A and 5B are fragmentary, cut away, and partially-sectioned views of slightly modified structure of the present invention wherein the same is used to extend the piston rod of actuating cylinder first in one direction (FIGURE 5A) and then in a return direction (FIGURE 5B).

Figure 1:
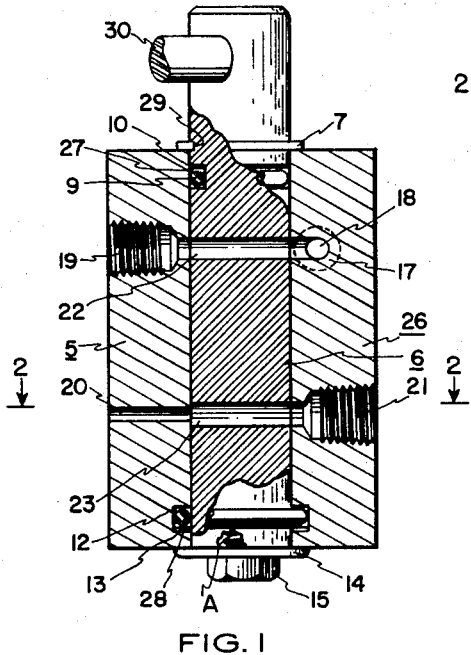
FIGURE 1 is an elevation, principally in section, of a basic valve unit incorporating the principles of the present invention.

In the drawings control unit 25, see FIGURE 5A, includes a control valve 26, the same being detailed in FIGURE 1. Control valve 26 is shown to include a valve body 5 and, rotatably disposed therewithin, a rotating valve spool 6. Valve spool 6 includes transverse fluid through-passageways 22 and 23, the same selectively cooperating with pressure port 18 (registering with inlet 17), exhaust port 20, and inlet-outlet, work-producing ports 19 and 21. The rotating valve spool 6 also includes a peripheral groove 27 for accommodating O-ring 9 and back-up ring 10.

Correspondingly, annular groove 12 is supplied in valve body 5 for accommodating O-ring 28 and back-up ring 13.

Snap ring 7 is disposed within snap-ring groove 29 of the valve spool 6, as indicated. Washer 14 and bolt 15 complete the construction. Bolt 15, by way of example, may be threaded onto an axially disposed and tapped aperture A in the rotating valve spool 6.

Figure 4:
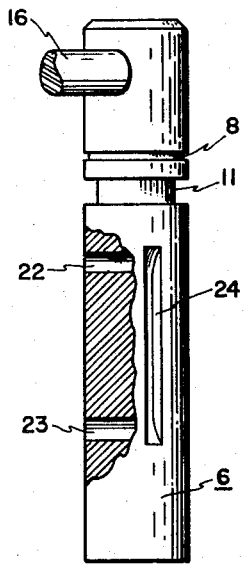
FIGURE 4 is an elevation, partially in section, of the valve spool of the subject valve.

Of special interest is the inclusion of a preferably milled, shunting-passageway 24, see FIGURE 4. There is a corresponding shunting-passageway 24' on the opposite surface area of valve spool 6.

Figure 2:
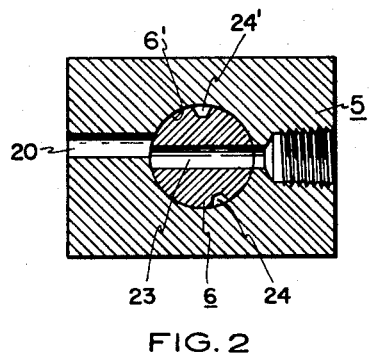
FIGURE 2 is a transverse horizontal section taken along the line 2—2 in FIGURE 1, wherein one condition of flow is present in the valve.

In operation, FIGURE 1 illustrates the condition wherein pressure port 18 is rendered in communication with valve port 19 via through-passageway 22. Correspondingly, cylinder return port 21 of the valve is rendered in communication with metered outlet port 21 via passageway 23. See also FIGURE 2. Even at full flow there is provided a slight misalignment of port 20 relative to the through-passageway 23 of valve spool 6. This can be used to selectively provide a fine metering adjustment via the actuation of control handle 30. To repeat, it is to be noted that a preferred design for the equipment is such that the axes of passageway or port 20 and port 21 are in slight misalignment. See FIGURE 2. By virtue of such a configuration, a very slight rotation of rotatable valve spool 6 about its own axis, by actuating control handle 30, effects a metering adjustment of fluid passing through port 20.

Figure 3:
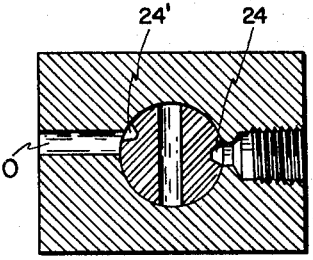
FIGURE 3 is a view taken along the line 2—2 in FIGURE 1 wherein the valve spool has been rotated to place the valve in a second fluid-conducting position.

A similar, controlled metering condition exists in the case of FIGURE 3 wherein the through-passageways 22 and 23 are brought out of alignment with ports 18, 19 and 21, 20, and the shunting apertures 24, 24' being brought into play. See FIGURES 3 and 4 in this regard. It will be noted with reference to FIGURE 3 that there is likewise a slight misalignment between surface passageway 24' and ports 19 and 20 (the former being shown in FIGURE 1 but not shown in FIGURE 3). A slight rotation of the valve spool 6 about its own axis, this being done by control handle 30, will effect control over fluid passing from passageway or port 19 down the shunting passageway 24' to port 20, all this while, however, the exact alignment may be enjoyed between shunting passageway 24 and ports 18 and 21. See FIGURES 1 and 3.

FIGURES 5A and 5B further elucidate the principles of the present invention. In FIGURE 5A the through-apertures or passageways 22 and 23 are shown to be in alignment with the ports 18, 19 and 21, 20, respectively. See also FIGURE 2. In such a condition there will exist an outward extension of the piston rod 32 associated with piston 33 in control cylinder 34. When the position of the valve is changed through the rotational displacement of rotating valve spool 6, see FIGURE 5B, then the flow through the valve is changed to that permitted by the condition of the valve, see FIGURE 3, so that the piston 33 and piston rod 32 will be retracted. The fluid flow is indicated by the arrows shown in the case of both conditions. In the FIGURE 5B condition the passageways 22 and 23 are seen to be out of registry, and the side or shunting passageways 24 and 24' are shown to be brought into play, connecting ports 18 and 21, and ports 19 and 20, respectively, as indicated.

Figure 6:
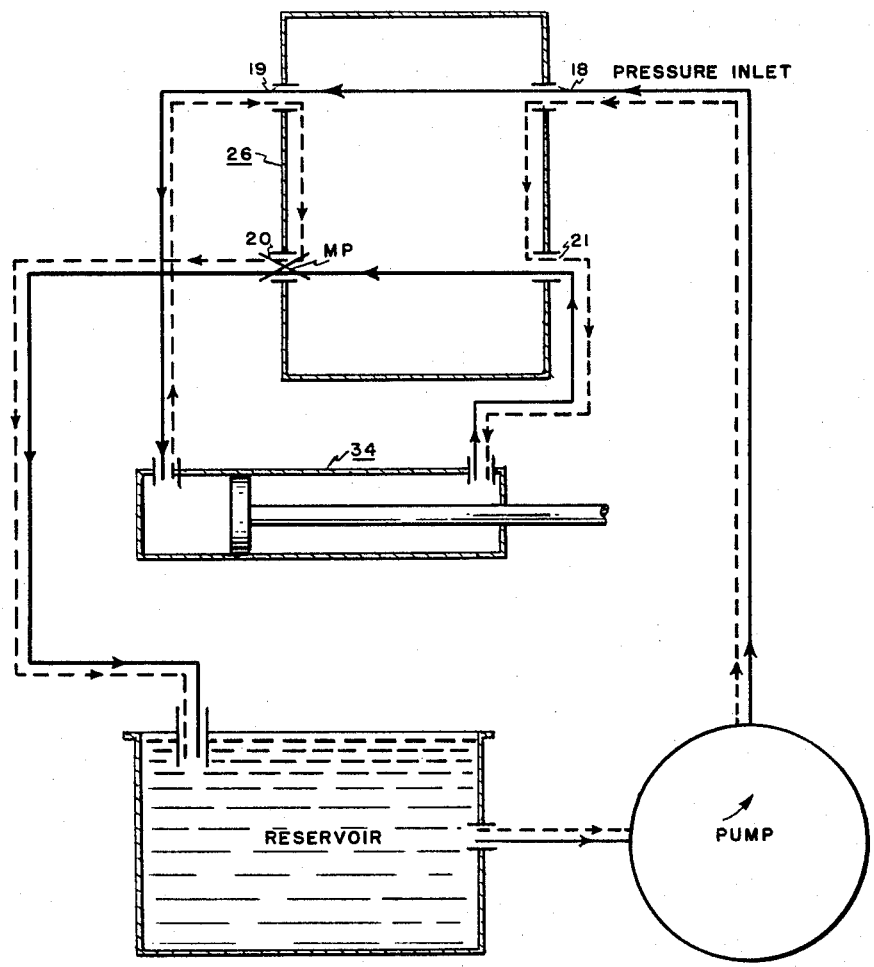
FIGURE 6 is a schematic view of the over-all system, and is included for purposes of clarity of understanding of the invention.

This is further illustrated in the system drawn in FIGURE 6. The solid arrows indicate direction of flow for the valve in one condition, i.e., that shown in FIGURES 1 and 5, and the dotted line arrows indicate the fluid flow in the case of the condition shown in FIGURES 3 and 6.

FIGURE 5A illustrates the reservoir area R within unit 25. Down-comer pipe P communicates with the exhaust port 20 for bringing fluid into reservoir R. Fluid from reservoir R enters check valve C into the pump PM. The output of the pump leads directly to pressure port 18. See phantom line 34.

Handle H is a control handle for the pump PM and actuates a conventional, double-acting piston (not shown). By actuating the pump handle pressure will be applied to port 18 to lead through the control valve 26 to the cylinder 34.

It is seen that this system is ideally suited for a number of purposes, including selectively providing a metered descent of equipment such as truck cabs from their erect position to the normal horizontal position, for driving purposes.

FIGURE 6 illustrates, in schematic diagram form, the basic system of the invention. The four-way control valve 26 includes valve spool 6 operatively disposed in bore 6' of valve body 5. Actuating cylinder 34 is shown to be hydraulically connected to valve 26 at ports 21 and 19 of the latter. Port 18 is a pressure port inlet. Port 20 is an outlet or exhaust port, with point MP being the metering point and including suitable metering structure. This preferably comprises a partially-registered passageway technique illustrated in FIGURES 1–3. Where such is the case, then the handle 30 not only controls valve condition (i.e., either neutral, direct, or reverse flow), but also, a fine adjustment may accomplish the desired metering for free fall or gravity descents. In this regard adjustment screw limit stops LM in FIGURES 5A and 5B are advantageously used.

Although the reservoir and pump may be disposed within unit 25, see FIGURE 5, they may likewise comprise separate units as shown in FIGURE 6. Where pump is a one-way flow, manually-operated pump, then reversal of valve condition, from which one bidirection flow changes to another bidirectional flow pattern, is easily accomplished. If the pump in FIGURE 6 is electrically or otherwise driven, then a suitable three-way valve should be used on the pressure side of pump and the pump output returned to the reservoir during gravity or "free" descent of structure utilizing the hydraulic lift system of the present invention.

The slight variations in port configurations in valve body 5, relative to FIGURES 1, 5A and 5B, are interchangeable, and other variations, of course, are permitted and are well within the scope of the present invention. FIGURES 5A and 5B particularly illustrate that the cylinder 34 may be secured to frame F of a vehicle; the piston rod 32 pivots to a cab C' so as to lift the same to the center of gravity position by the pump action of the pump in FIGURE 6 and, once the structure has passed the center of gravity position in either direction, the pump may be disposed in inoperative condition and the metered exhaust of the valve 26 relied upon to effect a controlled descent of the structure C in either desired direction.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A valve including, in combination, a valve body having a central bore, a rotatable valve spool operatively disposed within said bore, said valve spool having a pair of mutually-spaced, through-passageways disposed transversely through said valve spool, said valve body including plural valve ports individual pairs of which are registerable with opposite extremities of respective ones of said through-passageways, said valve spool also including a pair of shunting-passageways respectively and simultaneously registerable with respective ports of each pair of ports, and means connected to said valve spool for rotating the latter, said valve spool and valve body having means so mutually constructed and arranged that in one position said valve spool closes all of said ports, being nonconductive, in another position said valve spool interconnects the respective pairs of said ports via said through-passageways to provide fluid conduction therethrough in one bi-flow pattern, and in a third position said valve spool shunts, via said shunting-passageways, fluid conduction through corresponding ports of each pair of ports to provide fluid conduction between such ports in a second bi-flow pattern.

2. Structure according to claim 1 wherein said shunting-passageways comprise surface grooves.

3. Structure according to claim 1 wherein said valve body and valve spool are so constructed and arranged such that, when one port is in full registry with a respective one of said through-passageways, the remaining port associated with the same through-passageway is only partially in registry therewith.

4. Structure according to claim 1 wherein said valve body and valve spool are so constructed and arranged such that, when one port is in full registry with a respective one of said shunting-passageways, the remaining port associated with the same shunting-passageway is only partially in registry therewith.

5. Structure according to claim 3 wherein said valve body and valve spool are so constructed and arranged such that, when one port is in full registry with a respective one of said shunting-passageways, the remaining port associated with the same shunting-passageway is only partially in registry therewith.

6. Structure according to claim 5 wherein the same one of said ports enjoys, as an exhaust, partial registration, alternately, of both the said through-passageway and the said shunting-passageway associated therewith.

7. In combination, a four-way valve having a pressure inlet port, a pair of inlet-outlet, work-producing ports, and an exhaust port; metering means proximate said exhaust port for metering the flow therefrom for all flow directions through said work-producing ports; and means for varying the metering of said metering means.

8. Structure according to claim 7 wherein said controlling means also comprises means for actuating said valve to accomplish desired flow conditions.

9. In a hydraulic system including, a four-way valve having a pressure inlet port, a pair of inlet-outlet, work-producing ports, and an exhaust port; double-acting cylinder means including a piston and having a piston-forward-stroke inlet coupled to one of said work-producing ports and a piston-return-stroke inlet coupled to the remaining one of said work-producing ports; a pump coupled to said pressure inlet port; a reservoir coupled to said exhaust port; and conduit means coupling said reservoir to said pump; an improvement comprising means for selectively metering fluid exhausted from said exhaust port; and means for controlling said metering means coupled thereto.

10. The structure of claim 9 wherein said valve includes a valve body and a valve spool having mutually cooperating, partial-registration means as said metering means, and a valve position control coupled to said valve spool for effecting valve positioning and for constituting said metering means controlling means.

11. In a tractor, a cab having a horizontal pivot mount and hydraulic means coupled to said cab for raising and lowering said cab on opposite sides of said cab's pivot mount, said hydraulic means including means for providing for said cab braked, free-fall descent on opposite sides of said pivot mount.

References Cited

UNITED STATES PATENTS

| | | | |
|---|---|---|---|
| 2,014,997 | 9/1935 | Auger | 137—625.43 |
| 2,940,476 | 6/1960 | Schultz | 137—625.63 |
| 3,015,344 | 1/1962 | Hausmann et al. | 137—625.23 |

HENRY T. KLINKIEK, *Primary Examiner.*